United States Patent
Sugihara et al.

(10) Patent No.: US 11,302,993 B2
(45) Date of Patent: Apr. 12, 2022

(54) POWER STORAGE DEVICE COMPOSITION, POWER STORAGE DEVICE SEPARATOR USING POWER STORAGE DEVICE COMPOSITION, AND POWER STORAGE DEVICE

(71) Applicants: TAYCA CORPORATION, Osaka (JP); NIPPON CHEMI-CON CORPORATION, Tokyo (JP)

(72) Inventors: Ryosuke Sugihara, Osaka (JP); Keiichi Watanabe, Osaka (JP); Satoru Tsumeda, Tokyo (JP); Shuichi Ishimoto, Tokyo (JP)

(73) Assignees: TAYCA CORPORATION, Osaka (JP); NIPPON CHEMI-CON CORPORATION, Tokyo (JP)

( * ) Notice: Subject to any disclaimer, the term of this patent is extended or adjusted under 35 U.S.C. 154(b) by 274 days.

(21) Appl. No.: 16/610,035

(22) PCT Filed: Apr. 27, 2018

(86) PCT No.: PCT/JP2018/017185
§ 371 (c)(1),
(2) Date: Oct. 31, 2019

(87) PCT Pub. No.: WO2018/203522
PCT Pub. Date: Nov. 8, 2018

(65) Prior Publication Data
US 2020/0203691 A1   Jun. 25, 2020

(30) Foreign Application Priority Data

May 1, 2017 (JP) .............................. JP2017-091480
Jul. 11, 2017 (JP) .............................. JP2017-135139

(51) Int. Cl.
*H01M 50/431* (2021.01)
*H01G 11/52* (2013.01)
(Continued)

(52) U.S. Cl.
CPC ........ *H01M 50/431* (2021.01); *C01G 23/005* (2013.01); *H01G 11/52* (2013.01);
(Continued)

(58) Field of Classification Search
CPC ... C01G 23/005; C01G 23/04; H01M 50/431; H01M 50/434; H01G 11/52
See application file for complete search history.

(56) References Cited

U.S. PATENT DOCUMENTS 9,293,235 B2 * 3/2016 Yamamoto ........ H01M 10/0525
2006/0257746 A1 * 11/2006 Inagaki ................. H01M 4/364
429/231.5

(Continued)

FOREIGN PATENT DOCUMENTS

JP   1-203039 A    8/1989
JP   2003-197487 A 7/2003
(Continued)

OTHER PUBLICATIONS

Li et al "Synthesis of Li2TiO3 ceramic breeder powders by in-situ hydrolysis and its characterization", Materials Letters 89 (2012) 25-27.*

(Continued)

*Primary Examiner* — Mark Kopec
(74) *Attorney, Agent, or Firm* — Westerman, Hattori, Daniels & Adrian, LLP (57) ABSTRACT

There is demand for a power storage device composition that: compared to past lithium compounds, can suppress development of conductivity caused by blue discoloration (reduction), even when used in a reducing atmosphere; and (Continued)

can inhibit the generation of gases, such as carbon dioxide gas, hydrogen gas, and fluoride gas, that has been a problem in past power storage devices during use and with aging. This power storage device composition is characterized by including, as a principal component, $Li_2TiO_3$ that has an x-ray diffraction pattern for which the intensity ratio (A/B) of the peak intensity (A) at a diffraction angle of $2\theta=18.4\pm0.1°$ and the peak intensity (B) at a diffraction angle of $2\theta=43.7\pm0.1°$ is at least 1.10.

6 Claims, 4 Drawing Sheets

(51) Int. Cl.
  *C01G 23/00* (2006.01)
  *H01M 10/0525* (2010.01)
(52) U.S. Cl.
  CPC ..... *H01M 10/0525* (2013.01); *C01P 2002/72* (2013.01); *C01P 2006/40* (2013.01)

(56) References Cited

U.S. PATENT DOCUMENTS

2009/0107334 A1 4/2009 Oh-ishi et al.
2011/0189545 A1 8/2011 Holzapfel et al.
2018/0075980 A1 3/2018 Takaki et al.

FOREIGN PATENT DOCUMENTS

| JP | 2003-297699 A | 10/2003 |
| JP | 2011-521881 A | 7/2011 |
| JP | 5231016 B2 | 7/2013 |
| JP | 5485741 B2 | 5/2014 |
| JP | 2016-197647 A | 11/2016 |
| JP | 2016-197648 A | 11/2016 |
| JP | 2016-197649 A | 11/2016 |
| JP | 2017-177064 A | 10/2017 |
| WO | 2016/159359 A1 | 10/2016 |

OTHER PUBLICATIONS

Yu et al "Vacancy and substitution defects of beta-Li2TiO3 prepared by hydrothermal method", Chem. Lett. 2014, 43, 369-370.*
Nakagawa et al.; "Novel ceramic materials that absorb carbon dioxide", Toshiba Review, 2001 vol. 56, No. 8, pp. 11-14 with partial English translation (4 pages), cited in specification.
International Search Report dated Aug. 7, 2018, issued in counterpart International Application No. PCT/JP2018/017185 (2 pages).

* cited by examiner

POWER STORAGE DEVICE COMPOSITION, POWER STORAGE DEVICE SEPARATOR USING POWER STORAGE DEVICE COMPOSITION, AND POWER STORAGE DEVICE

TECHNICAL FIELD

The present invention relates to a composition used for power storage devices such as lithium-ion batteries and electric double-layer capacitors. More specifically, the present invention relates to a power storage device composition that includes, as a principal component, a lithium titanate ($Li_2TiO_3$) having a specific peak ratio and that, compared to past lithium compounds, can thereby suppress development of conductivity caused by blue discoloration (reduction), even when used in a reducing atmosphere.

The present invention further relates to a power storage device separator and a power storage device that include, as a principal component, a lithium titanate ($Li_2TiO_3$) having a specific peak ratio and that can thereby inhibit, without decreasing battery characteristics, the generation of gases, such as carbon dioxide gas, hydrogen gas, and fluoride gas, which has been a problem in past power storage devices during use and with aging.

BACKGROUND ART

In recent years, power storage devices such as lithium-ion batteries and electric double-layer capacitors have rapidly come into practical use because a reduction in the size of the power storage devices can be realized while these devices have high capacities.

However, such a power storage device has a problem in that gases, such as carbon dioxide gas, hydrogen gas, and fluoride gas are generated in the power storage device due to, for example, impurities that are present in the power storage device (for example, unreacted lithium carbonate remaining in an active material), mixing of moisture, or oxidative decomposition of an electrolytic solution or a material constituting an electrode caused by the use. Such gases may cause a deterioration in battery characteristics of the power storage device. Continuation of the generation of the gases may cause liquid leakage from the power storage device or a change in the shape (expansion) and finally result in a critical phenomenon such as catching fire or explosion.

Here, such gases include a gas (carbon dioxide gas) generated by degradation (decomposition) of unreacted lithium carbonate with time or oxidative decomposition of an electrolytic solution due to repetitive charging and discharging. Besides such a gas, protons ($H^+$), which become a cause of hydrogen gas or fluoride gas, are also generated. Specific examples thereof include a proton ($H^+$) generated by electrolysis of moisture itself that enters the inside of the power storage device and a proton ($H^+$) generated by dissociation of hydrogen fluoride (HF) that is formed by a reaction between an anion such as $BF_4^-$ or $PF_6^-$ generated by decomposition of an electrolyte and moisture that enters the inside of the power storage device when lithium hexafluorophosphate ($LiPF_6$) or lithium tetrafluoroborate ($LiBF_4$) is used as the electrolyte in an electrolytic solution. Such protons are bound to each other to generate hydrogen gas, or fluoride ions dissociated from hydrogen fluoride (HF) are bound to each other to generate fluoride gas.

The gases further include carbon dioxide gas generated by a reaction between an anion such as $BF_4^-$ or $PF_6^-$ generated by decomposition of an electrolyte and unreacted lithium carbonate.

In view of the above, heretofore, gas absorbents that include, as principal components, various compounds (mainly lithium compounds) have been developed in order to absorb generated gases (Patent Literatures 1 to 3). Specifically, Patent Literature 1 discloses that a lithium composite oxide is used as an absorbent of carbon dioxide gas, and zeolite is used as an absorbent of hydrogen gas (refer to Claims 2 and 3 and [0012] to [0014] of Patent Literature 1). Patent Literature 2 discloses that lithium hydroxide is used as an absorbent of, for example, carbon dioxide gas and hydrogen gas (refer to Claim 3 and [0009] and [0010] of Patent Literature 2). Patent Literature 3 discloses that a carbonate of an alkaline earth metal is used as an absorbent of fluoride gas (refer to Claims 1, 3, and 4 and [0014] of Patent Literature 3).

Furthermore, Patent Literature 4 discloses a carbon dioxide gas absorber in which a lithium carbonate powder, a lithium oxide powder, and a titanium dioxide powder are mixed in a specific ratio (refer to Claim 1 and [0028] of Patent Literature 4). Non Patent Literature 1 discloses that a lithium composite oxide is usable as an absorbent of carbon dioxide gas (refer to "Features of novel $CO_2$ absorbents" in page 12 of Non Patent Literature 1).

CITATION LIST

Patent Literature

PTL 1: Japanese Unexamined Patent Application Publication No. 2003-297699
PTL 2: Japanese Unexamined Patent Application Publication No. 2003-197487
PTL 3: Japanese Patent No. 5485741
PTL 4: Japanese Patent No. 5231016

Non Patent Literature

NPL 1: Kazuaki Nakagawa and Masahiro Kato, "Novel ceramic materials that absorb carbon dioxide", Toshiba Review, vol. 56, No. 8 (2001)

SUMMARY OF INVENTION

Technical Problem

However, an object (technical idea) of each of these literatures is to absorb a gas that has been generated and is not to inhibit the generation of a gas itself, that is, not to trap protons ($H^+$) themselves, which become a source of the generation of a gas.

The various types of absorbents disclosed in these literatures may prevent phenomena such as liquid leakage, a change in the shape (expansion), catching fire, and explosion. Nevertheless, the generation of a gas still occurs (for example, oxidative decomposition of an electrolytic solution or a material constituting an electrode still occurs), and thus a deterioration in the battery characteristics cannot be prevented.

In addition, lithium compounds are moved in a power storage device in the form of lithium ions. Accordingly, when lithium compounds disclosed in Patent Literatures 1 to 4 are present in the vicinity of the negative electrode or on the negative electrode side, lithium ions are reduced (discolored to blue) and conductivity is thereby developed, resulting in a problem of the occurrence of a short-circuit (short) phenomenon.

Accordingly, heretofore, in the case of using a lithium compound, the lithium compound has been generally used as a material of the positive electrode. In the case of using a lithium compound as a material of a separator, the lithium compound is used in a form in which the lithium compound is arranged on or applied to the positive electrode side (form in which the lithium compound is not exposed on the negative electrode side). However, in the case of using a lithium compound in this form, the production process is complicated.

Recently, the inventors of the present invention have conducted extensive studies. As a result, it has been found that, compared to past lithium compounds, a composition that includes, as a principal component, a lithium titanate having a specific peak ratio can suppress development of conductivity caused by blue discoloration (reduction), even when used in a reducing atmosphere. It has been found that, in particular, even when the composition is used as a material of a separator, unlike the related art, the composition need not be used in the form in which the composition is arranged on or applied to the positive electrode side (form in which the composition is not exposed on the negative electrode side), and a complicated production process need not be employed.

It has also been found that while development of conductivity caused by blue discoloration (reduction) is suppressed, generation of gases, such as carbon dioxide gas, hydrogen gas, and fluoride gas, that has been a problem in past power storage devices during use and with aging is also inhibited, specifically, it is possible to trap protons (H$^+$) themselves, which become a source of the generation of a gas.

The present invention has been made in view of the above-described problems in the related art. An object of the present invention is to provide a power storage device composition capable of suppressing development of conductivity caused by blue discoloration (reduction). Another object is to provide a power storage device separator using the power storage device composition, and a power storage device.

Solution to Problem

In order to achieve the above objects, a power storage device composition according to the present invention includes, as a principal component, Li$_2$TiO$_3$ that has an X-ray diffraction pattern for which an intensity ratio (A/B) of a peak intensity (A) at a diffraction angle of 2θ=18.4±0.1° to a peak intensity (B) at a diffraction angle of 2θ=43.7±0.1° is at least 1.10.

A power storage device separator according to the present invention uses the power storage device composition of the present invention.

A power storage device according to the present invention uses the power storage device separator of the present invention.

Advantageous Effects of Invention

According to the power storage device composition according to the present invention, it is possible to provide a power storage device composition that, compared to past lithium compounds, can suppress development of conductivity caused by blue discoloration (reduction), even when used in a reducing atmosphere.

In addition, since a lithium titanate having a specific peak ratio is included as a principal component, it is possible to provide a power storage device that can inhibit, without decreasing the power storage device performance (while reducing a leakage current), the generation of gases, such as carbon dioxide gas, hydrogen gas, and fluoride gas, which has been a problem in past power storage devices during use and with aging.

Specifically, as in the reaction formula shown below, lithium ions of the power storage device composition of the present invention and protons generated in a power storage device are subjected to an ion-exchange reaction, and protons (H$^+$) themselves, which become a source of the generation of a gas can be thereby trapped.

A titanate ion of the power storage device composition of the present invention and a carbonate ion are subjected to an ion-exchange reaction, and carbon dioxide gas can also be thereby trapped.

Li$_2$TiO$_3$+2H$^+$⇌H$_2$TiO$_3$+2Li$^+$(proton trapping=ion-exchange reaction)

Li$_2$TiO$_3$+CO$_2$→Li$_2$CO$_3$+TiO$_2$(CO$_2$ absorption)

Furthermore, in the case where the power storage device composition of the present invention is used in a separator of a power storage device, it is possible to provide a power storage device that does not cause a deterioration in battery characteristics and that can inhibit the generation of gases even in a form in which the power storage device composition of the present invention is slightly exposed on the negative electrode side of the separator (even when a strict production control is not performed so that a lithium compound is not exposed on the negative electrode side as in the past separators).

(Basic Structure)

A power storage device composition of the present invention includes, as a principal component, 213-type lithium titanate (Li$_2$TiO$_3$) among lithium titanates. Furthermore, the power storage device composition includes, as a principal component, Li$_2$TiO$_3$ that has an X-ray diffraction pattern for which an intensity ratio (A/B) of a peak intensity (A) at a diffraction angle of 2θ=18.4±0.1° to a peak intensity (B) at a diffraction angle of 2θ=43.7±0.1° is at least 1.10. Since the power storage device composition of the present invention includes, as a principal component, Li$_2$TiO$_3$ having a specific peak ratio, compared to past lithium compounds, development of conductivity caused by blue discoloration (reduction) can be suppressed even when the power storage device composition is used in a reducing atmosphere.

Usually, lithium titanates are produced (synthesized) by mixing a Li source and a Ti source that serve as raw materials and firing the resulting mixture. Consequently, not only Li$_2$TiO$_3$ but also lithium titanates having various structures such as a spinel-type structure (Li$_4$Ti$_5$O$_{12}$) and a ramsdellite-type structure (LiTi$_2$O$_4$: 124-type and Li$_2$Ti$_3$O$_7$, 237-type) are synthesized.

Accordingly, the phrase "includes as a principal component" as used in the present invention means that a lithium titanate having a composition of Li$_2$TiO$_3$ is included as a principal component even in the case where lithium titanates having various structures are also included as described above. Specifically, the composition that includes Li$_2$TiO$_3$ as a principal component refers to a composition in which a content of the lithium titanate having a composition of Li$_2$TiO$_3$ is 70% or more. Furthermore, the content is more preferably 90% or more and most preferably 95% or more.

(X-Ray Diffraction Pattern)

Furthermore, the power storage device composition of the present invention includes, as a principal component, $Li_2TiO_3$ having an intensity ratio (A/B) of at least 1.10 where A represents an intensity of a peak at a diffraction angle of $2\theta=18.4\pm0.1°$, which is a characteristic peak of the 002 plane in the crystal structure of $Li_2TiO_3$ and B represents an intensity of a peak at a diffraction angle of $2\theta=43.7\pm0.1°$, which is a characteristic peak of the 113 plane in the crystal structure of $Li_2TiO_3$. Specifically, the power storage device composition of the present invention has a feature of $Li_2TiO_3$ that is grown in the 002 plane direction, and thus, compared to past lithium compounds, can suppress development of conductivity caused by blue discoloration (reduction), even when used in a reducing atmosphere.

The upper limit of the peak intensity ratio (A/B) is not particularly limited as long as the peak intensity ratio is at least 1.10. However, even when the peak intensity ratio is excessively increased, the effect of suppressing blue discoloration (reduction) has reached a peak. Accordingly, the upper limit of the peak intensity ratio (A/B) is preferably 1.50. In the above range, the peak intensity ratio (A/B) is preferably 1.10 to 1.33.

(Li Source)

The Li source serving as a raw material of the power storage device composition of the present invention is not particularly limited, and various Li sources such as lithium carbonate, lithium hydroxide, and lithium nitrate can be used. Among these, lithium hydroxide is preferably used from the viewpoint of easily producing a power storage device composition having a specific peak intensity ratio of the present invention.

(Ti Source)

The Ti source serving as a raw material of the power storage device composition of the present invention is also not particularly limited as in the Li source. Various Ti sources such as various titanic acid compounds, e.g., metatitanic acid; anatase or rutile titanium oxide; titanium chloride; titanium sulfate; and titanium oxysulfate sulfate can be used. Among these, anatase titanium oxide is preferably used from the viewpoint of easily producing a power storage device composition having a specific peak intensity ratio of the present invention.

When a titanium oxide is used as the Ti source, a moisture content in the crystal structure of the titanium oxide is preferably less than 25% by weight, more preferably less than 15% by weight, and most preferably less than 10% by weight. On the other hand, the use of a titanium oxide having a moisture content in the crystal structure of 25% by weight or more is not preferable because it is difficult to produce a power storage device composition having a specific peak intensity ratio of the present invention. Herein, the moisture content in the crystal structure refers to a weight reduction rate in a temperature range from 100° C. to 400° C. in thermogravimetry (TG).

(Lightness (L Value))

Since the power storage device composition of the present invention has a specific peak ratio, the power storage device composition can suppress development of conductivity caused by reduction and thus exhibits a characteristic hue.

Here, it is known that, in general, when a lithium titanate is reduced, the color of the lithium titanate is changed to blue. In the power storage device composition of the present invention, the blue discoloration is suppressed even before and after charging. Specifically, the power storage device composition exhibits a lightness (L value) of 80 or more. In particular, a power storage device composition that exhibits a lightness (L value) of 82 to 93 is preferred.

(Production Method)

A known method can be employed as a method for producing a power storage device composition of the present invention. From the viewpoint that a lithium titanate ($Li_2TiO_3$) having a specific peak ratio can be obtained at a high content, the power storage device composition of the present invention is preferably produced by performing firing once in air at a temperature of 650° C. or higher for two hours. In particular, the power storage device composition of the present invention is more preferably produced by performing firing once in air at a temperature of 750° C. to 850° C. for two hours.

In addition, it is necessary to strictly control a ratio Li/Ti (molar ratio) so that the content of the lithium titanate having a composition of $Li_2TiO_3$ reaches 95% or more. The ratio Li/Ti (molar ratio) is preferably 1.85 or more and 2.10 or less. The ratio Li/Ti (molar ratio) is more preferably 1.90 or more and 2.05 or less and most preferably 1.95 or more and 2.00 or less.

(Power Storage Device Separator)

The power storage device composition according to the present invention can be used as a material of a power storage device such as a lithium-ion battery or an electric double-layer capacitor, specifically, a material of a positive electrode or a separator. In particular, the use of the power storage device composition as a material of a separator is advantageous in that, unlike the related art, the composition need not be used in the form in which the composition is arranged on or applied to the positive electrode side and that a complicated production process need not be employed.

DESCRIPTION OF EMBODIMENTS

Examples

Next, power storage device compositions according to the present invention will be described in detail on the basis of Examples and Comparative Examples. It is to be understood that the present invention is not limited to Examples described below.

Example 1

First, 300 g of anatase titanium oxide (AMT-100, manufactured by TAYCA Corporation) whose moisture content had been adjusted to 9% by weight and 266 g of lithium hydroxide were wet-mixed. A ratio Li/Ti (molar ratio) at this time was 1.98. Next, the resulting mixture was fired in air at 750° C. for two hours. Thus, a power storage device composition of Example 1, the composition including 213-type lithium titanate ($Li_2TiO_3$) as a principal component, was produced.

Example 2

A power storage device composition of Example 2, the composition including 213-type lithium titanate ($Li_2TiO_3$) as a principal component, was produced as in Example 1 except that the firing temperature was 850° C.

Example 3

A power storage device composition of Example 3, the composition including 213-type lithium titanate ($Li_2TiO_3$) as a principal component, was produced as in Example 1 except that the firing temperature was 650° C.

Comparative Example 1

A power storage device composition of Comparative Example 1, the composition including 213-type lithium titanate ($Li_2TiO_3$) as a principal component, was produced as in Example 1 except that the firing temperature was 550° C.

Comparative Example 2

A power storage device composition of Comparative Example 2, the composition including 213-type lithium titanate ($Li_2TiO_3$) as a principal component, was produced as in Example 1 except that the firing temperature was 450° C.

Comparative Example 3

A power storage device composition of Comparative Example 3, the composition including 213-type lithium titanate ($Li_2TiO_3$) as a principal component, was produced as in Example 1 except that the ratio Li/Ti (molar ratio) was 1.84.

Comparative Example 4

A power storage device composition of Comparative Example 4 was produced as in Example 1 except that the ratio Li/Ti (molar ratio) was 2.11.

Comparative Example 5

A power storage device composition of Comparative Example 5 was produced as in Example 1 except that 396 g of anatase titanium oxide (manufactured by TAYCA Corporation n) whose moisture content had been adjusted to 31% by weight was used as the Ti source.

Comparative Example 6

A power storage device composition of Comparative Example 6 was produced as in Comparative Example 3 except that the firing temperature was 550° C.

Measurement of Peak Intensity Ratio A/B and Measurement of X-Ray Diffraction

Next, regarding each of the power storage device compositions produced in Examples 1 to 3 and Comparative Examples 1 to 6, measurement with an X-ray diffractometer (X'Pert, manufactured by Malvern Panalytical Ltd.) was conducted. FIGS. 1 to 9 show the results.

A peak intensity (A) at a diffraction angle of $2\theta=18.4\pm0.1°$ and a peak intensity (B) at a diffraction angle of $2\theta=43.7\pm0.1°$ were measured, and a peak intensity ratio A/B was calculated from the peak intensities (A) and (B). According to the results, as shown in Table 1, the peak intensity ratio A/B of the power storage device composition of Example 1 was 1.25, the peak intensity ratio A/B of the power storage device composition of Example 2 was 1.33, the peak intensity ratio A/B of the power storage device composition of Example 3 was 1.10, the peak intensity ratio A/B of the power storage device composition of Comparative Example 1 was 0.98, the peak intensity ratio A/B of the power storage device composition of Comparative Example 2 was 0.34, the peak intensity ratio A/B of the power storage device composition of Comparative Example 3 was 0.98, the peak intensity ratio A/B of the power storage device composition of Comparative Example 4 was 1.09, the peak intensity ratio A/B of the power storage device composition of Comparative Example 5 was 1.03, and the peak intensity ratio A/B of the power storage device composition of Comparative Example 6 was 0.72.

Table 1 shows the ratio Li/Ti (molar ratio), the firing temperature (° C.), the moisture content (% by weight) of the Ti source, and the peak intensity ratio (A/B) of each of the power storage device compositions produced in Examples 1 to 3 and Comparative Examples 1 to 6.

TABLE 1

|  | Li/Ti (molar ratio) | Firing temperature (° C.) | Moisture content of Ti source (% by weight) | Peak intensity ratio (A/B) |
| --- | --- | --- | --- | --- |
| Example 1 | 1.98 | 750 | 9 | 1.25 |
| Example 2 | 1.98 | 850 | 9 | 1.33 |
| Example 3 | 1.98 | 650 | 9 | 1.10 |
| Comparative Example 1 | 1.98 | 550 | 9 | 0.98 |
| Comparative Example 2 | 1.98 | 450 | 9 | 0.34 |
| Comparative Example 3 | 1.84 | 750 | 9 | 0.98 |
| Comparative Example 4 | 2.11 | 750 | 9 | 1.09 |
| Comparative Example 5 | 1.98 | 750 | 31 | 1.03 |
| Comparative Example 6 | 1.84 | 550 | 9 | 0.72 |

Next, power storage device separators were produced by using the power storage device compositions produced above, and power storage devices using the separators were produced. Evaluations of the effect of suppressing blue discoloration (measurement of lightness (L value)), the effect of inhibiting the generation of gases, and a battery characteristic (leakage current) were conducted.

Production of Power Storage Device Separator

First, 8.6 g of each of the power storage device compositions of Examples 1 to 3 and Comparative Examples 1 to 6 and 4.5 g of polyvinylidene fluoride were kneaded, and the resulting mixture was then diluted with 16.9 g of N-methyl-2-pyrrolidone (manufactured by Kishida Chemical Co., Ltd.) to prepare a coating material for a separator.

Next, the above-prepared coating material for a separator was applied to a separator (manufactured by Nippon Kodoshi Corporation) using a wire bar. Thus, each separator for a power storage device was produced. Regarding the separator for a power storage device after application, the coating material for a separator was slightly exposed to a surface to be located on the negative electrode side in the production of a power storage device described below. Separators having four types (levels) of amounts of coating, namely, 10 g/m$^2$, 20 g/m$^2$, 40 g/m$^2$, and 70 g/m$^2$ were produced.

(Production of Power Storage Device)

First, 520 g of orthotitanic acid (manufactured by TAYCA Corporation) and 218 g of lithium hydroxide monohydrate (manufactured by FMC Corporation) were wet-mixed, and the resulting mixture was then fired in air at 750° C., 700° C., 650° C., or 550° C. for two hours. Thus, fine particles Li$_4$Ti$_5$O$_{12}$ having a specific surface area of 20 m$^2$/g, 50 m$^2$/g, 70 m$^2$/g, or 100 m$^2$/g were obtained.

Next, the above-produced separators for power storage devices, positive electrodes in which activated carbon (AP20-0001, manufactured by AT electrode Co., Ltd.) was used as a positive electrode active material, and four types (levels) of negative electrodes in which the Li$_4$Ti$_5$O$_{12}$ having a specific surface area of 20 m$^2$/g, 50 m$^2$/g, 70 m$^2$/g, or 100 m$^2$/g was used as a negative electrode active material were prepared.

Figure 1:
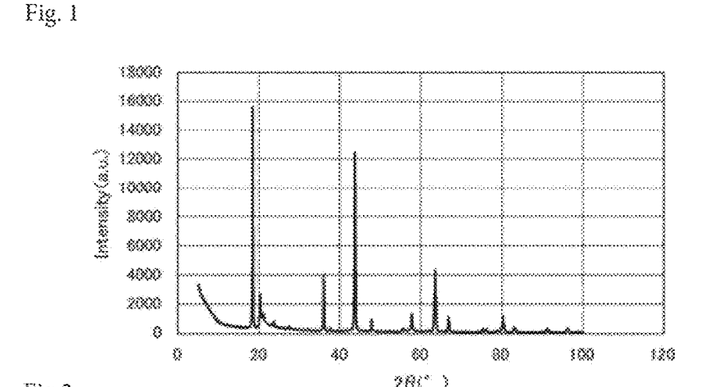
FIG. 1 is an X-ray diffraction chart of a power storage device composition according to Example 1.
Figure 2:
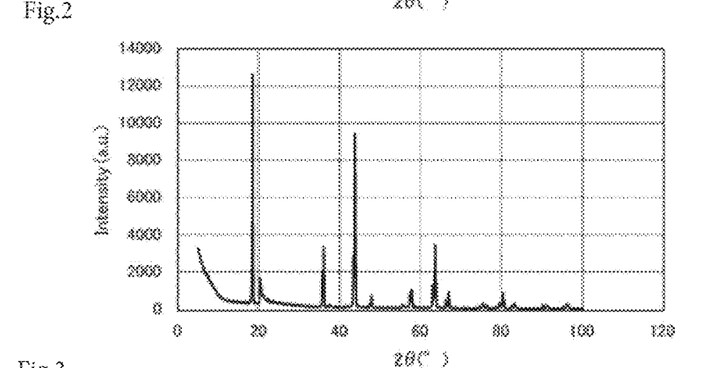
FIG. 2 is an X-ray diffraction chart of a power storage device composition according to Example 2.
Figure 3:
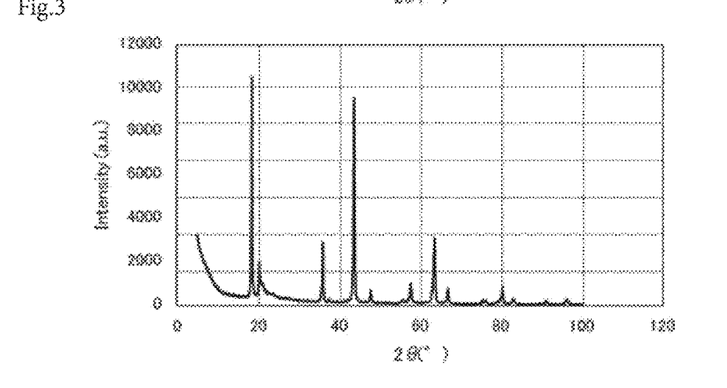
FIG. 3 is an X-ray diffraction chart of a power storage device composition according to Example 3.
Figure 4:
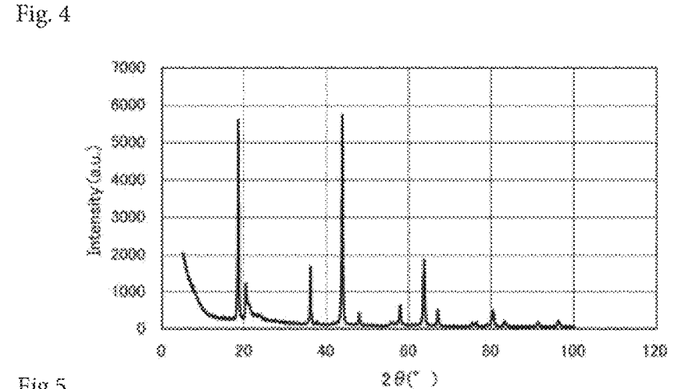
FIG. 4 is an X-ray diffraction chart of a power storage device composition according to Comparative Example 1.
Figure 5:
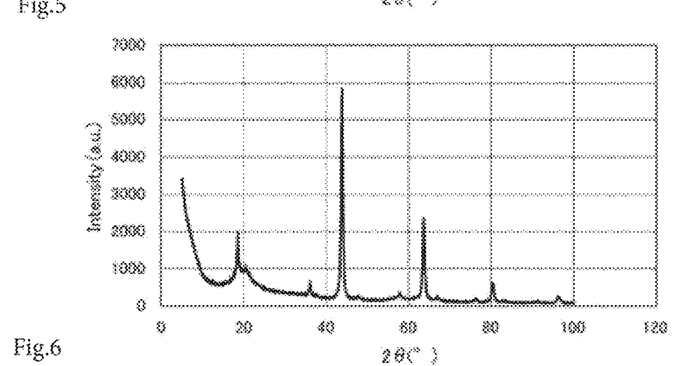
FIG. 5 is an X-ray diffraction chart of a power storage device composition according to Comparative Example 2.
Figure 6:
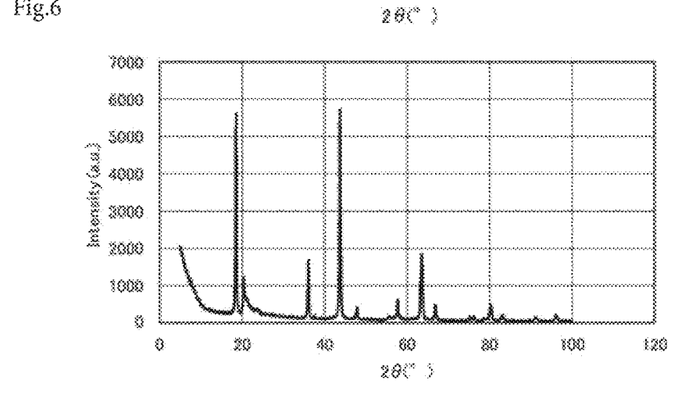
FIG. 6 is an X-ray diffraction chart of a power storage device composition according to Comparative Example 3.
Figure 7:
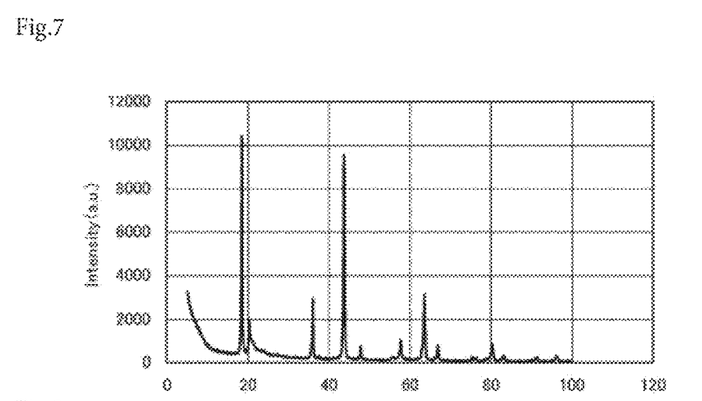
FIG. 7 is an X-ray diffraction chart of a power storage device composition according to Comparative Example 4.
Figure 8:
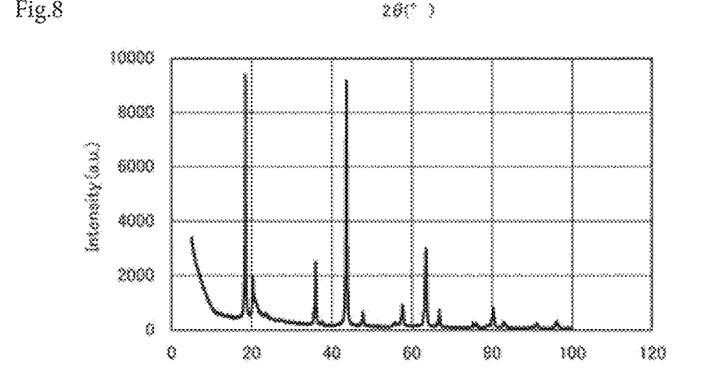
FIG. 8 is an X-ray diffraction chart of a power storage device composition according to Comparative Example 5.
Figure 9:
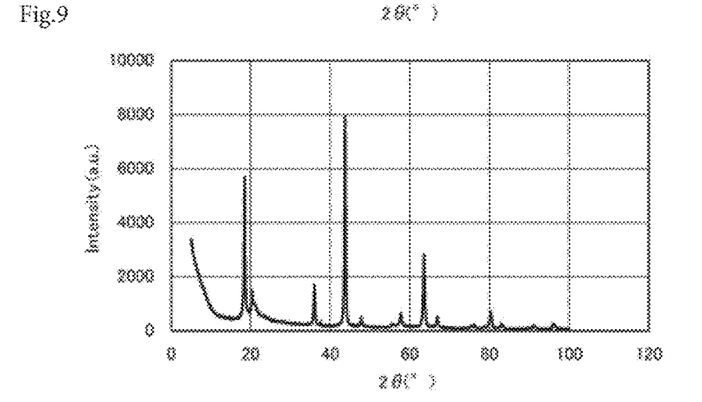
FIG. 9 is an X-ray diffraction chart of a power storage device composition according to Comparative Example 6.
Figure 10:
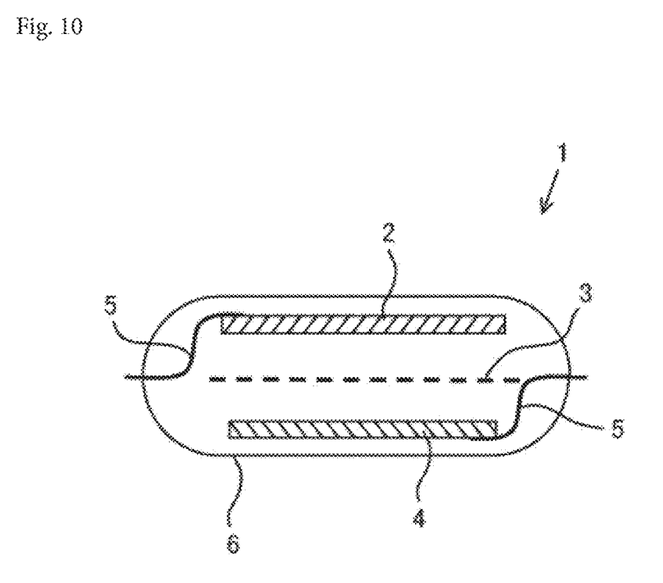
FIG. 10 is a schematic view illustrating the structure of a produced power storage device.

Each separator for a power storage device and the negative electrode active material were combined as described in Table 2, arranged (stacked) as illustrated in FIG. 10, and then placed in a case. A 1M LiBF$_4$/EC:DEC=1:2 (manufactured by Kishida Chemical Co., Ltd.) was further injected as an electrolytic solution, and the case was then sealed. Thus, power storage devices of Examples 4 to 12 and Comparative Examples 7 to 12 were produced. The electric capacitance of each power storage device at this time was 600 µAh.

In addition to the power storage devices of Comparative Examples 7 to 12, a power storage device of Comparative Example 13 was also produced as a comparative example in which only a separator manufactured by Nippon Kodoshi Corporation (separator for a power storage device, the separator not having the coating material for a separator) was used.

(Measurement of Lightness (L Value))

Each of the power storage devices produced in Examples 4 to 12 and Comparative Examples 7 to 13 was charged up to 2.9 V at 25° C. The power storage device after charging was disassembled, and the separator was removed. Subsequently, the lightness (L value) of the separator was measured by using a color-difference meter (ZE6000, manufactured by Nippon Denshoku Industries Co., Ltd.).

(Measurement of Leakage Current)

Each of the power storage devices produced in Examples 4 to 12 and Comparative Examples 7 to 13 was charged up to 2.9 V at 60° C., and a constant voltage of 2.9 V was then maintained. Subsequently, 30 minutes after maintaining the constant voltage, a current value was measured as a leakage current.

(Measurement of Amount of Gas Generated)

First, an initial volume of each of the power storage devices produced in Examples 4 to 12 and Comparative Examples 7 to 13 was measured on the basis of the Archimedes' principle. Specifically, the power storage device was submerged in a water tank filled with water at 25° C., and the initial volume of the power storage device was calculated from a change in weight at that time.

Next, charging and discharging of the power storage device was performed three cycles at 60° C., in a voltage range of 1.5 to 2.9 V, and at a charge/discharge rate of 0.5 C. Subsequently, the volume of the power storage device after charging and discharging was calculated by the same method as the measuring method described above. A change in the volume of the power storage device before and after charging and discharging was determined by the difference from the initial volume to measure an amount of gases generated from the power storage device. A rate of change in volume of the power storage device was also determined from a calculation formula below.

$$\text{Rate of change in volume (\%)} = \text{change in volume (mL)/initial volume (mL)} \times 100$$

Table 2 shows the results. According to the results, regarding each of the power storage devices of Examples 4 to 12, since a lithium titanate (Li$_2$TiO$_3$) having a peak intensity ratio A/B of at least 1.10 was applied to a separator, the lightness (L value) of the separator was a high value in a range of from 82 to 93. Thus, blue discoloration (reduction) was suppressed even in the state where the lithium titanate (Li$_2$TiO$_3$) was slightly exposed to a surface located on the negative electrode side.

In contrast, regarding each of the power storage devices of Comparative Examples 7 to 12, the results showed that since a lithium titanate (Li$_2$TiO$_3$) having a peak intensity ratio A/B of less than 1.10 was applied to a separator, the lightness (L value) of the separator was a low value in a range of from 18 to 35. Thus, the lithium titanate (Li$_2$TiO$_3$) was subjected to blue discoloration (reduction).

Next, regarding the leakage current, since blue discoloration (reduction) was suppressed in each of the power storage devices of Examples 4 to 12, the current value was a low value of 0.12 to 0.43 mAh.

In contrast, the results showed that, in each of the power storage devices of Comparative Examples 7 to 12, since the lithium titanate (Li$_2$TiO$_3$) was subjected to blue discoloration (reduction), the current value was a high value of 0.87 to 0.96 mAh, which was substantially equal to the current value (0.92 mAh) of the power storage device of Comparative Example 13 in which only the separator (separator for a power storage device, the separator not having the coating material for a separator) was used.

Furthermore, regarding the effect of inhibiting the generation of gases, the results showed that the amount (absolute quantity) of gases generated from each of the power storage devices of Examples 4 to 12 was smaller than that of the power storage device of Comparative Example 13 in which only the separator (separator for a power storage device, the separator not having the coating material for a separator) was used, and that the rate of change in volume of each of the power storage devices of Examples 4 to 12 was also lower than that of the power storage device of Comparative Example 13 (more specifically, the rate of change in volume was 5% or less).

TABLE 2

| | Presence or absence of lithium titanate | Peak intensity ratio (A/B) | Amount of coating of lithium titanate (g/m$^2$) | Specific surface area of negative electrode active material (m$^2$/g) | Lightness of separator (L value) | Leakage current (mAh) | Initial volume of power storage device (mL) | Change in volume of power storage device (mL) | Rate of change in volume of power storage device (%) |
|---|---|---|---|---|---|---|---|---|---|
| Example 4 | Li$_2$TiO$_3$ (Example 1) | 1.25 | 20 | 70 | 87 | 0.35 | 2.32 | 0.05 | 2.2 |
| Example 5 | Li$_2$TiO$_3$ (Example 2) | 1.33 | 20 | 70 | 93 | 0.12 | 2.33 | 0.10 | 4.3 |
| Example 6 | Li$_2$TiO$_3$ (Example 3) | 1.10 | 20 | 70 | 82 | 0.36 | 2.32 | 0.02 | 0.9 |
| Example 7 | Li$_2$TiO$_3$ (Example 1) | 1.25 | 10 | 70 | 90 | 0.43 | 2.19 | 0.10 | 4.6 |
| Example 8 | Li$_2$TiO$_3$ (Example 1) | 1.25 | 40 | 70 | 90 | 0.35 | 2.63 | 0.01 | 0.4 |
| Example 9 | Li$_2$TiO$_3$ (Example 1) | 1.25 | 70 | 70 | 90 | 0.26 | 3.04 | 0.10 | 3.3 |
| Example 10 | Li$_2$TiO$_3$ (Example 1) | 1.25 | 20 | 20 | 87 | 0.35 | 2.32 | 0.01 | 0.4 |
| Example 11 | Li$_2$TiO$_3$ (Example 1) | 1.25 | 20 | 50 | 87 | 0.35 | 2.35 | 0.01 | 0.4 |
| Example 12 | Li$_2$TiO$_3$ (Example 1) | 1.25 | 20 | 100 | 87 | 0.35 | 2.35 | 0.08 | 3.4 |
| Comparative Example 7 | Li$_2$TiO$_3$ (Comparative Example 1) | 0.98 | 20 | 70 | 27 | 0.90 | 2.33 | 0.05 | 2.1 |
| Comparative Example 8 | Li$_2$TiO$_3$ (Comparative Example 2) | 0.34 | 20 | 70 | 20 | 0.89 | 2.32 | 0.05 | 2.2 |
| Comparative Example 9 | Li$_2$TiO$_3$ (Comparative Example 3) | 0.98 | 20 | 70 | 23 | 0.91 | 2.32 | 0.05 | 2.2 |
| Comparative Example 10 | Li$_2$Ti18 (Comparative Example 4) | 1.09 | 20 | 70 | 35 | 0.87 | 2.31 | 0.05 | 2.2 |
| Comparative Example 11 | Li$_2$TiO$_3$ (Comparative Example 5) | 1.03 | 20 | 70 | 20 | 0.90 | 2.33 | 0.07 | 3.0 |
| Comparative Example 12 | Li$_2$TiO$_3$ (Comparative Example 6) | 0.72 | 20 | 70 | 18 | 0.96 | 2.32 | 0.10 | 4.3 |
| Comparative Example 13 | Absent | — | — | 70 | — | 0.92 | 2.07 | 0.31 | 15.0 |

The above results showed the following. Since the power storage device composition according to the present invention includes, as a principal component, a lithium titanate (Li$_2$TiO$_3$) having a specific peak ratio, compared to past lithium compounds, development of conductivity caused by blue discoloration (reduction) can be suppressed, even when used in a reducing atmosphere. In addition, a leakage current can be reduced while development of conductivity caused by blue discoloration (reduction) is suppressed. Furthermore, it is possible to inhibit the generation of gases, such as carbon dioxide gas, hydrogen gas, and fluoride gas, that has been a problem in past power storage devices during use and with aging.

The power storage device composition of the present invention can be used for power storage devices such as lithium-ion batteries and electric double-layer capacitors.

REFERENCE SIGNS LIST 1 power storage device
2 positive electrode
3 separator (including power storage device composition)
4 negative electrode
5 tab lead
6 case

The invention claimed is:

1. A power storage device composition comprising, as a principal component, Li$_2$TiO$_3$ that has an X-ray diffraction pattern for which an intensity ratio (A/B) of a peak intensity (A) at a diffraction angle of 2θ=18.4±0.1° to a peak intensity (B) at a diffraction angle of 2θ=43.7±0.1° is 1.10 to 1.50.

2. A power storage device separator comprising the power storage device composition according to claim 1.

3. A power storage device comprising the power storage device separator according to claim 2.

4. The power storage device composition according to claim 1, wherein the intensity ratio (A/B) is 1.10 to 1.33.

5. The power storage device separator comprising the power storage device composition according to claim 4, wherein the power storage device separator has a lightness of L value of 87 to 93.

6. The power storage device comprising the power storage device separator comprising the power storage device composition according to claim 4, wherein the power storage device has a leakage current of 0.12 to 0.43 mAh.

* * * * *